United States Patent
Goh et al.

(10) Patent No.: US 12,267,646 B2
(45) Date of Patent: Apr. 1, 2025

(54) ACOUSTIC TRANSDUCER AND METHOD FOR MANUFACTURING ACOUSTIC TRANSDUCER

(71) Applicant: AAC Technologies Pte. Ltd.

(72) Inventors: KianHeng Goh, Batu Pahat (MY); Chungmin Li, Taiwan (CN); Qiang Dan, Shenzhen (CN); Kahkeen Lai, Singapore (SG)

(73) Assignee: AAC Technologies Pte. Ltd., Singapore (SG)

( * ) Notice: Subject to any disclaimer, the term of this patent is extended or adjusted under 35 U.S.C. 154(b) by 189 days.

(21) Appl. No.: 18/110,860

(22) Filed: Feb. 16, 2023

(65) Prior Publication Data

US 2024/0284120 A1    Aug. 22, 2024

(51) Int. Cl.
*H04R 31/00* (2006.01)
*H04R 17/00* (2006.01)

(52) U.S. Cl.
CPC ......... *H04R 17/005* (2013.01); *H04R 31/006* (2013.01)

(58) Field of Classification Search
CPC ...... G01H 11/08; H10N 30/07; H10N 30/302; H04R 17/005; H04R 31/006; H04R 31/00; H04R 17/02
See application file for complete search history.

(56) References Cited

U.S. PATENT DOCUMENTS 11,856,365 B2 * 12/2023 Ikeuchi ............. H10N 30/088
2022/0329951 A1 * 10/2022 Umezawa .......... H10N 30/2043

* cited by examiner

*Primary Examiner* — Brian Ensey
(74) *Attorney, Agent, or Firm* — W&G Law Group

(57) ABSTRACT

An acoustic transducer includes: substrate including first silicon layer, first oxide layer and second silicon layer, back chamber is formed therethrough; second oxide layer on the substrate; piezoelectric unit on the second oxide layer and including first electrode layer, piezoelectric layer and second electrode layer; slit and opening formed in the second electrode layer; metal pad stacked on the first electrode layer at the opening; and additional film layer including first, second and third parts, the first part is in the slit, side wall and bottom wall of the first part form groove, and through slot is formed in the third part to expose metal pad.

10 Claims, 3 Drawing Sheets

ACOUSTIC TRANSDUCER AND METHOD FOR MANUFACTURING ACOUSTIC TRANSDUCER

TECHNICAL FIELD

The present disclosure relates to the technical field of semiconductors and, in particular, to an acoustic transducer and a method for preparing an acoustic transducer.

BACKGROUND

Typical acoustic transducers utilize liquid or paste type polymers to create an additional film layer on top of a piezoelectric element using a spin-coating method. The polymer completely fills the accessible spaces on a patterned structure. However, there is a high risk that the spin coated materials may not distribute evenly on the different surface topographies. In addition, fully filled polymers may limit vibrating displacement and performance.

SUMMARY

The object of the present disclosure is to provide an acoustic transducer and a method for preparing an acoustic transducer, so as to solve the technical problems in the related art.

In a first aspect, the present disclosure provides an acoustic transducer, including: a substrate including a first silicon layer, a first oxide layer and a second silicon layer sequentially stacked from bottom to top, a back chamber is formed in the substrate, the back chamber sequentially penetrates through the first silicon layer and the first oxide layer, and the second silicon layer is exposed by the back chamber; a second oxide layer formed on the substrate; a piezoelectric unit formed on the second oxide layer and including a first electrode layer, a piezoelectric layer and a second electrode layer sequentially stacked from bottom to top; a slit formed in the middle of the second electrode layer and penetrating through the second electrode layer, the piezoelectric layer, the first electrode layer, the second oxide layer and the second silicon layer; an opening formed at an edge of the second electrode layer and penetrating through the second electrode layer and the piezoelectric layer, the first electrode layer is exposed by the opening; a metal pad stacked on the first electrode layer at the opening; and an additional film layer including a first part, a second part and a third part, the first part is formed in the slit, a side wall of the first part is attached to an inner wall surface of the slit, a bottom wall of the first part covers a bottom opening of the slit, and the side wall and the bottom wall of the first part surround to form a groove having a top opening, the second part is formed on the second electrode layer, and the third part is formed in the opening and wraps the metal pad, a through slot is formed penetrating through the third part and corresponding to the metal pad, and the metal pad is exposed by the through slot.

As an improvement, the first part, the second part and the third part have a same thickness, and the thicknesses of the first part, the second part and the third part at each position are consistent.

As an improvement, the metal pad has a thickness smaller than the piezoelectric layer.

As an improvement, an axis of the groove is coaxial with an axis of the back chamber.

As an improvement, a plane where a bottom of the groove is located intersects with the second silicon layer.

In a second aspect, the present disclosure also provides a method for manufacturing an acoustic transducer, including: providing a substrate, the substrate includes a first silicon layer, a first oxide layer and a second silicon layer sequentially stacked from bottom to top; sequentially forming a second oxide layer, a first electrode layer, a piezoelectric layer and a second electrode layer on top of the second silicon layer from bottom to top; forming a slit by etching in the middle of the second electrode layer and forming an opening by etching at an edge of the second electrode layer, the slit penetrates through the second electrode layer, the piezoelectric layer, the first electrode layer, the second oxide layer and the second silicon layer, the opening penetrates through the second electrode layer and the piezoelectric layer, and the first electrode layer is exposed by the opening; forming a metal pad on the first electrode layer at the opening; forming an additional film layer, a first part of the additional film layer is deposited in the slit, a side wall of the additional film layer covers an inner wall surface of the slit, a bottom wall of the first part covers the first oxide layer, and the side wall and the bottom wall surround to form a groove having a top opening, a second part of the additional film layer is deposited on the second electrode layer, and a third part of the additional film layer is deposited in the opening and wraps the metal pad, a through slot is formed penetrating through the third part and corresponding to the metal pad, and the metal pad is exposed by the through slot; and forming a back chamber on bottom of the first silicon layer, the back chamber sequentially penetrates through the first silicon layer and the first oxide layer, and the second silicon layer is exposed by the back chamber.

As an improvement, the additional film layer is made of a poly-p-xylylene material.

As an improvement, the additional film layer is formed by a vapor deposition process.

As an improvement, the vapor deposition process includes a physical vapor deposition process or a chemical vapor deposition process.

As an improvement, the piezoelectric layer is made of one of lead zirconate titanate, aluminum nitride, barium titanate, or any combination thereof.

Compared with the related art, the present disclosure additional film layer is formed by vapor deposition, a first part of the additional film layer is deposited in the slit, a side wall of the additional film layer covers an inner wall surface of the slit, a bottom wall of the first part covers the first oxide layer, and the side wall and the bottom wall surround to form a groove having a top opening, a second part of the additional film layer is deposited on the second electrode layer, and a third part of the additional film layer is deposited in the opening and wraps the metal pad, a through slot is formed penetrating through the third part and corresponding to the metal pad, and the metal pad is exposed by the through slot, so that the piezoelectric unit can vibrate with the maximum displacement and the lowest restriction, thereby effectively improving SPL and structural reliability, in the additional film layer can also cover sharp corners (>85° sidewall), the thickness of the additional film layer is evenly distributed on the surface of the piezoelectric unit, which is suitable for larger area acoustic transducers.

REFERENCE SIGNS 10-substrate, 11-back chamber, 12-first silicon layer, 13-first oxide layer, 14-second silicon layer;
20-second oxide layer;
30-piezoelectric unit, 31-first electrode layer, 32-piezoelectric layer, 33-second electrode layer;
40-slit;
50-opening;
60-additional film layer, 61-first part, 62-second part, 63-third part, 64-groove, 65-through slot;
70-metal pad.

DESCRIPTION OF EMBODIMENTS

The embodiments described below with reference to the drawings are exemplary only for explaining the present disclosure and should not be construed as limiting the present disclosure.

Figure 1:
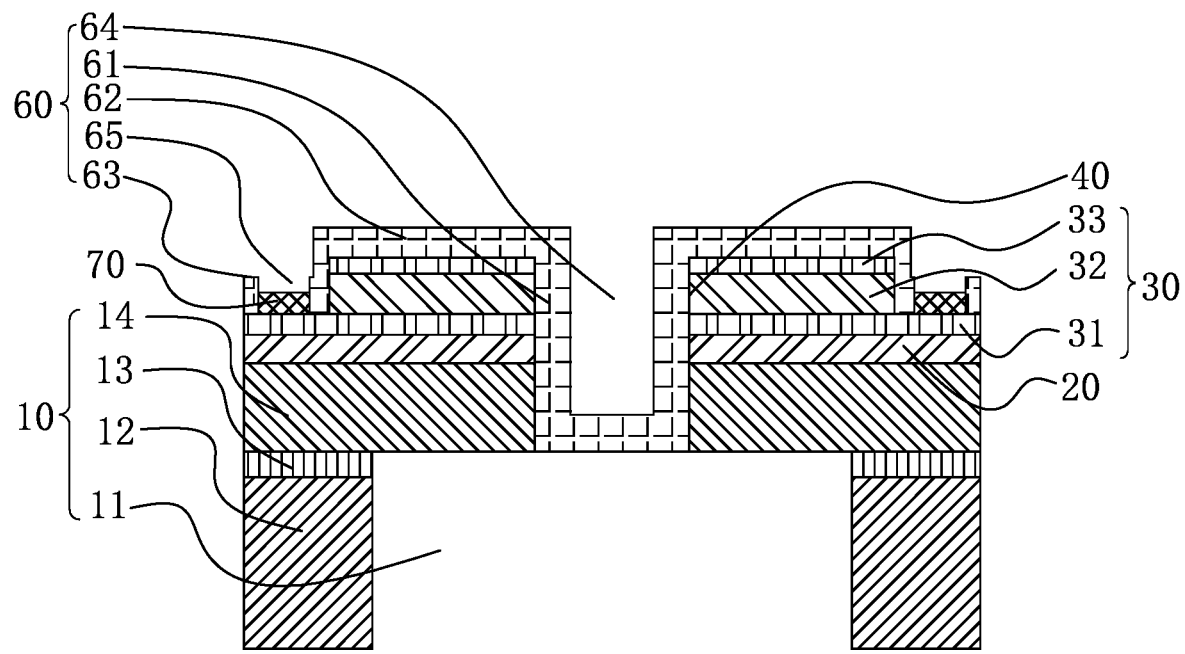
FIG. 1 is a schematic cross-sectional view of an acoustic transducer according to an embodiment of the present disclosure.

FIG. 1 is a schematic cross-sectional view of an acoustic transducer according to an embodiment of the present disclosure. As shown in FIG. 1, an embodiment of the present disclosure provides an acoustic transducer, including first silicon layer 10, second oxide layer 20, piezoelectric unit 30, additional film layer 60 and metal pad 70.

The substrate 10 includes from bottom to top a first silicon layer 12, a first oxide layer 13 and a second silicon layer 14. The substrate 10 is provided with a back chamber 11. Optionally, an inner contour surface of the back chamber 11 is a circular groove structure. The back chamber 11 sequentially penetrates through the first silicon layer 12 and the first oxide layer 13, and the second silicon layer 14 is exposed by the back chamber 11. In an embodiment, the first oxide layer 13 of $SiO_2$ material is prepared by vapor deposition method, thermal oxidation method or thermal decomposition method on the first silicon layer 12 of silicon material, and the second silicon layer 14 is formed on the first oxide layer 13 by vapor deposition method, thermal oxidation method or thermal decomposition method. The second silicon layer 14 and the first silicon layer 12 may be made of the same material. The first oxide layer 13 is located under the second silicon layer 14 and has a significantly lower etching rate compared with the second silicon layer 14. When the slit 40 or the back chamber 11 is formed, it is ensured that the etching process is more uniformly stopped at the interface of the first oxide layer 13 and the second silicon layer 14.

The second oxide layer 20 is formed on the substrate 10, and the second oxide layer 20 is formed by magnetron sputtering on the surface of the second silicon layer 14.

The piezoelectric unit 30 is formed on the substrate 10 and includes from bottom to top a first electrode layer 31, a piezoelectric layer 32, and a second electrode layer 33 stacked in sequence.

The first electrode layer 31 is formed on the second oxide layer 20 by electron beam lift-off or magnetron sputtering, and the first electrode layer 31 is patterned by a photolithography process. The first electrode layer 31 is connected to the bottom electrode pad (not shown) through a bottom electrode lead (not shown), the material of the first electrode layer 31 can be one or more of Al, Mo, W, Pt, Cu, Ag, Au, ZrN, or may be also other materials with good electrical conductivity. In an embodiment, the first electrode layer 31 is made of molybdenum (Mo).

The piezoelectric layer 32 is deposited on the first electrode layer 31. The piezoelectric layer 32 has the characteristics of generating mechanical vibration in the presence of an electric field and the characteristics of generating an electric field when the mechanical vibration occurs. The piezoelectric layer 32 can be lead zirconate titanate, nitrogen aluminum oxide or barium titanate or any other piezoelectric material. In an embodiment, the piezoelectric layer 32 is made of aluminum nitride.

The second electrode layer 33 is formed on the piezoelectric layer 32 by the electron beam lift-off or the magnetron sputtering, and the second electrode layer 33 is patterned using a photolithography process. The second electrode layer 33 passes through the top electrode lead (not shown) is connected to the top electrode pad (not shown), and the material of the second electrode layer 33 can be one or more of Al, Mo, W, Pt, Cu, Ag, Au, ZrN, or other materials having good conductive property. In an embodiment, the second electrode layer 33 is made of molybdenum (Mo).

A slit 40 and an opening 50 are formed in the piezoelectric unit 30. The slit 40 is formed in the middle of the second electrode layer 33. In an embodiment, the slit 40 has an inner contour formed as a circular groove. An axis of the slit 40 coincides with an axis of the back chamber 11. The slit 40 sequentially penetrates through the second electrode layer 33, the piezoelectric layer 32, the first electrode layer 31, the second oxide layer 20 and the second silicon layer 14, until the slit 40 is in communication with the back chamber 11. The opening 50 is formed at an edge of the second electrode layer 33. Optionally, the opening 50 has a circular groove structure. The opening 50 sequentially penetrates through the second electrode layer 33 and the piezoelectric layer 32, and the first electrode layer 31 is exposed by the opening 50.

The metal pad 70 is stacked on the first electrode layer 31 at the opening 50, so that the metal pad 70 is electrically connected to the first electrode layer 31. In an embodiment, a patterned hard mask is formed on the second electrode layer 33, and the opening 50 is etched at the edge of the second electrode layer 33 through dry etching or wet etching, so that part of the first electrode layer 31 is exposed, and then the metal pad 70 is deposited on the first electrode layer 31 to form electrical connection.

The additional film layer 60 includes a first part 61, a second part 62 and a third part 63. In an embodiment, the first part 61, the second part 62 and the third part 63 integrally form into one piece, to facilitate the molding process and improve the structural stability. The second part 62 is located at the peripheral edge of the first part 61, and the third part 63 is located at the peripheral edge of the second part 62. The first part 61 is formed in the slit 40, and the bottom wall of the first part 61 covers the bottom opening of the slit 40, and the side wall and the bottom wall of the first part 61 surround to form a groove 64 having a top opening. The second part 62 is deposited on the second electrode layer 33, and the third part 63 is deposited in the opening 50 and wraps the metal pad 70. The additional film layer 60 may be any type of polymer. A through slot 65 is formed penetrating through the third part 63. The position of the through slot 65 corresponds to the position of the metal pad 70. An orthographic projection of the metal pad 70 along the thickness direction of the third part 63 is located within the through slot 65, and the metal pad 70 is exposed by the through slot 65.

Through providing the additional film layer 60 to cover the slit 40, the sound pressure loss due to air leakage caused by the slit 40 is reduced. The additional film layer 60 has certain tensile deformation capacity, when the piezoelectric unit 30 vibrates, the additional film layer 60 deforms, to reduce the restriction to the movement of the piezoelectric unit 30. In the present disclosure, the additional film layer 60 is made of poly-p-xylylene, and is formed by vapor deposition method. The vapor deposition method includes physical vapor deposition or chemical vapor deposition, both of which can achieve good deposition effects. The chemical vapor deposition (CVD) is a process using gaseous or vaporous poly-p-xylylene to react on the second electrode layer 33 and the metal pad 70 to form a thin film. Physical vapor deposition (PVD) is to use physical methods (such as evaporation, sputtering, etc.) to vaporize poly-p-xylylene, and deposit a thin film on the surface of the second electrode layer 33 and the metal pad 70. Both of these two methods can bring a film with good thickness uniformity.

Compared to the typical fully filled liquid type, the piezoelectric unit 30 can vibrate with maximum displacement and lowest restriction. The additional film layer 60 can even cover sharp corners (>85° side wall), so as to effectively improve the SPL and the structural reliability.

In the present disclosure, the first part 61, the second part 62, and the third part 63 have the same thickness, and the thickness uniformity at each position of the first part 61, the second part 62, and the third part 63 are consistent. As a result, the thickness of the additional film layer 60 is uniformly distributed on the surface of the piezoelectric unit 30, it is beneficial to adapt to an acoustic transducer having a large area, the deformation of the piezoelectric unit 30 conforms to a regular parabola, so as to avoid the restricted deformation of local areas of the piezoelectric unit 30 due to arrangement of the additional film layer 60, thereby improving reliability of the acoustic transducer.

As shown in FIG. 1, the thickness of the metal pad 70 is smaller than the thickness of the piezoelectric layer 32, the axis of the groove 64 is coaxial to the axis of the back chamber 11, the groove 64 is located in the middle of the first part 61, and the plane where the bottom of the groove 64 is intersected with the second silicon layer 14, so that the compliance of deformation of the first part 61 is increased, which provides less restriction to the movement of the piezoelectric unit 30. As a result, when the piezoelectric layer 32 deforms, less restriction occurs, which further improve the SPL and the structural reliability.

Figure 2A:
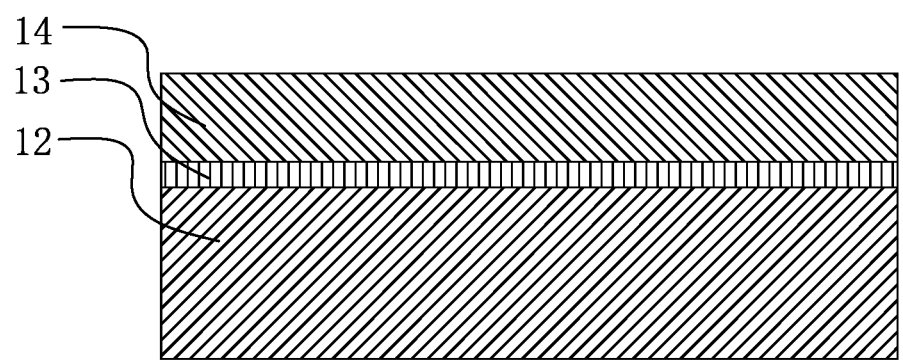
FIGS. 2A-2E are flow diagrams of showing manufacture of an acoustic transducer according to embodiments of the present disclosure.

FIGS. 2A-2E are flow diagrams of showing manufacture of an acoustic transducer according to embodiments of the present disclosure. The method includes the following process:

As shown in FIG. 2A, a substrate 10 is provided. A first silicon layer 12 is formed. The first oxide layer 13 of $SiO_2$ material is prepared by vapor deposition method, thermal oxidation method or thermal decomposition method on the first silicon layer 121, and the second silicon layer 14 is formed on the first oxide layer 13 by vapor deposition method, thermal oxidation method or thermal decomposition method. The second silicon layer 14 and the first silicon layer 12 can be made of the same material.

Figure 2B:
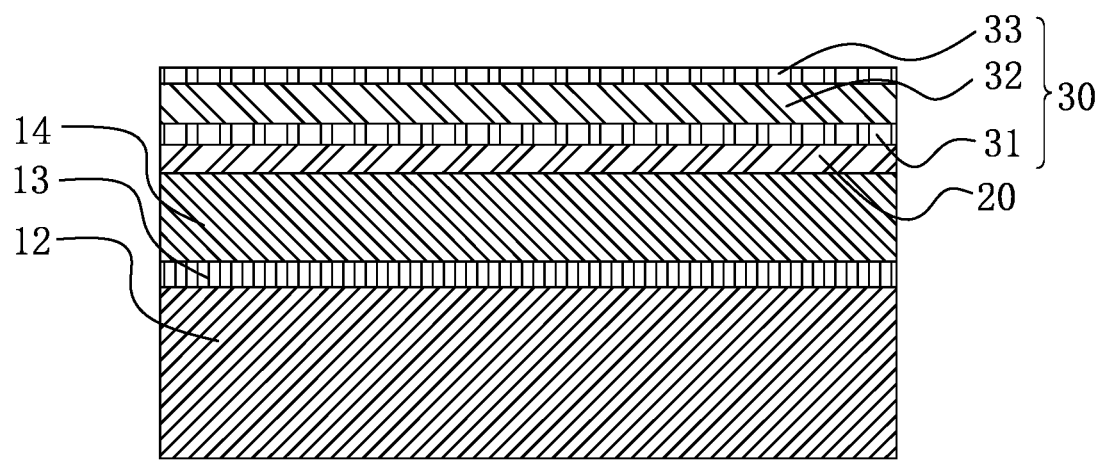

As shown in FIG. 2B, the second oxide layer 20 is formed on the first side of the substrate 10. A second oxide layer 20 is grown on the surface of the second silicon layer 14 by magnetron sputtering. On the top of the second oxide layer 20, a first electrode layer 31, a piezoelectric layer 32 and a second electrode layer 33 are formed by deposition from bottom to top. The first electrode layer 31 is formed on the second oxide layer 20 by electron beam lift-off or magnetron sputtering, and the first electrode layer 31 is patterned by using a photolithography process. The first electrode layer 31 is connected to the bottom electrode pad through a bottom electrode lead. The piezoelectric layer 32 is deposited on the first electrode layer 31, the second electrode layer 33 is formed on the piezoelectric layer 32 by electron beam lift-off or magnetron sputtering, and the second electrode layer 33 is patterned using the photolithography process. The second electrode layer 33 is connected to the top electrode pad through a top electrode lead.

Figure 2C:
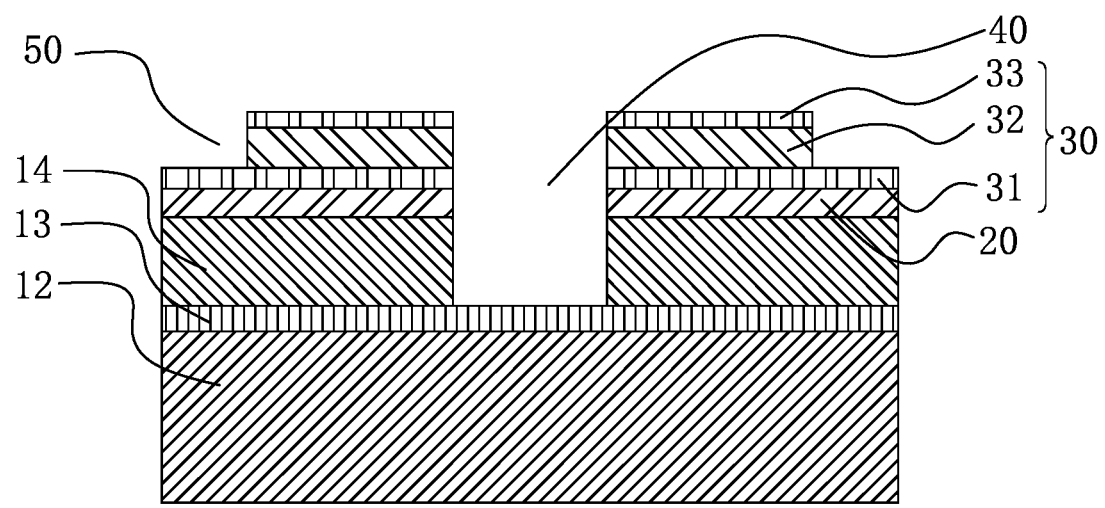

As shown in FIG. 2C, a slit 40 is etched in the middle of the second electrode layer 33, and an opening 50 is etched at the edge of the second oxide layer 33. The slit sequentially penetrates through the second electrode layer 33, the piezoelectric layer 32, the first electrode layer 31, the second oxide layer 20 and the second silicon layer 14. The opening 50 sequentially penetrates the second electrode layer 33 and the piezoelectric layer 32, and the first electrode layer 31 is exposed by the opening 50. In an embodiment, the slit 40 and the opening 50 are formed by dry etching or wet etching.

Figure 2D:
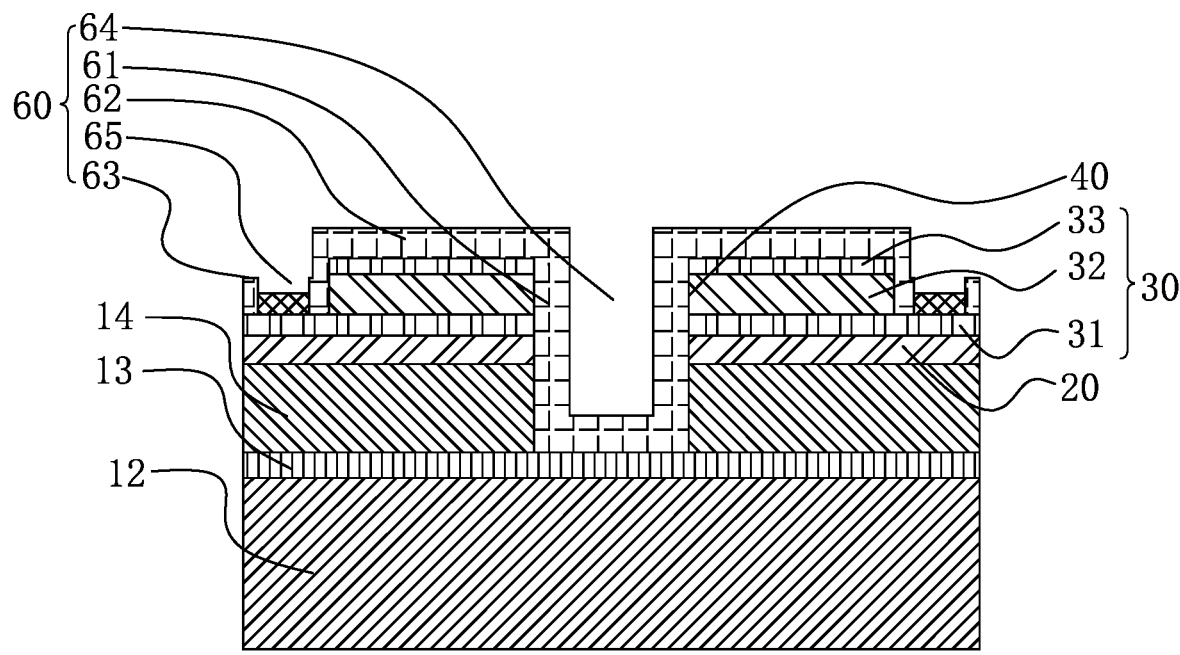

As shown in FIG. 2D, a metal pad 70 is deposited on the first electrode layer 31 at the opening 50. The metal pad 70 is deposited on the first electrode layer 31 by electron beam lift-off or magnetron sputtering to form an electrical connection. An additional film layer 60 is formed by vapor deposition. The first part of the first part 61 is formed in the slit 40, the bottom wall of the first part 61 covers the bottom opening of the slit 40, and the side wall and the bottom wall of the first part 61 surround to form a groove 64 having a top opening. The second part 62 is deposited on the second electrode layer 33, and the third part 63 is deposited in the opening 50 and wraps the metal pad 70. A through slot 65 is formed penetrating through the third part 63. The position of the through slot 65 corresponds to the position of the metal pad 70. An orthographic projection of the metal pad 70 along the thickness direction of the third part 63 is located within the through slot 65, and the metal pad 70 is exposed by the through slot 65. In an embodiment, the additional film layer 60 is made of poly-p-xylylene. The vapor deposition method includes physical vapor deposition or chemical vapor deposition, both of which can achieve good deposition effect. In an embodiment, the additional film layer 60 is polydimethylsiloxan material. The chemical vapor deposition (CVD) is to use gaseous or vapor state poly-p-xylylene to react on top surface of the second electrode layer 33 and top surface of the metal pad 70 and in the slit 40 to form a thin film. Physical vapor deposition (PVD) is to use physical methods (such as evaporation, sputtering, etc.) to vaporize poly-p-xylylene, and deposit a thin film on the top surface of the second electrode layer 33 and the top surface of the metal pad 70 as well as in the slit 40.

Figure 2E:
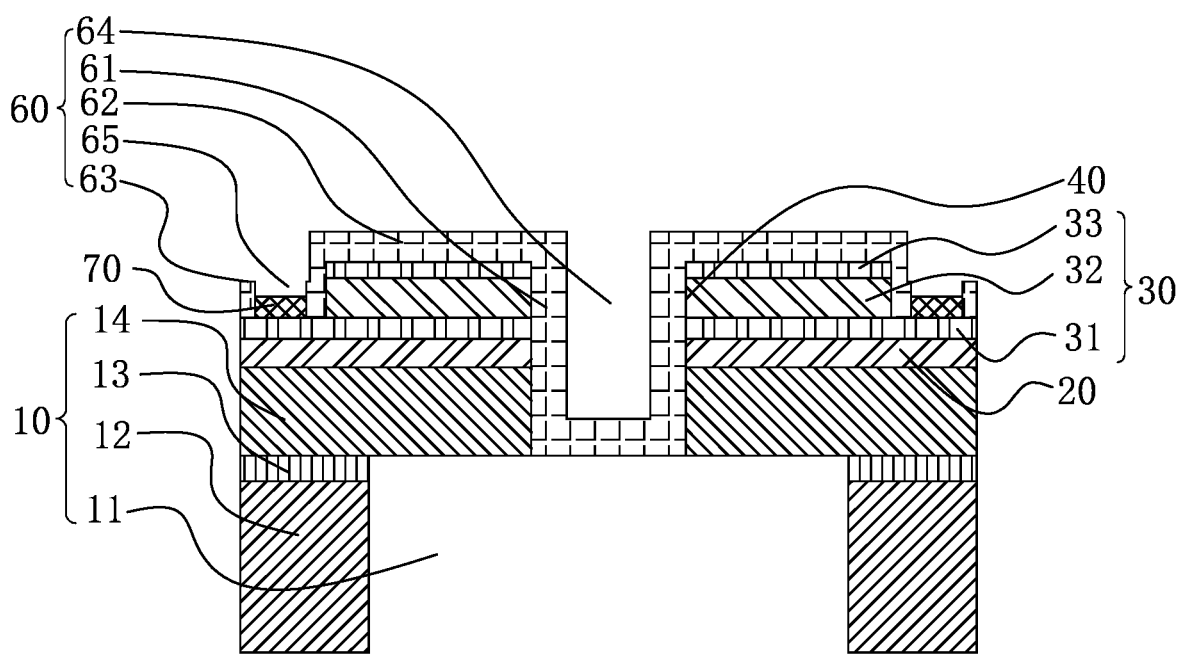

As shown in FIG. 2E, a back chamber 11 is formed on the bottom of the first silicon layer 12. The back chamber 11 sequentially penetrates through the first silicon layer 12 and the first oxide layer 13, and the second silicon layer 14 is exposed by the back chamber 11. In an embodiment, the back chamber 11 is formed by dry etching or wet etching.

In the acoustic transducer prepared by the above-mentioned methods, the additional film layer 60 is deposited by vapor deposition, and the piezoelectric unit 30 can vibrate with the maximum displacement and the lowest restriction, thereby effectively improving the SPL and structural reliability, the additional film layer 60 can even cover sharp corners (>85° sidewall), the thickness of the additional film layer 60 is uniformly distributed on the surface of the piezoelectric unit 30, which is suitable for acoustic transducers having a larger area.

The structures, features and effects of the present disclosure have been described in detail above based on the embodiments shown in the drawings. The above descriptions are only preferred embodiments of the present disclosure, but the present disclosure is not limited to the embodiments shown in the drawings. Changes or modifications made based on the concept of the present disclosure are still within the protection scope of the present disclosure.

What is claimed is:

1. An acoustic transducer, comprising:
a substrate including a first silicon layer, a first oxide layer and a second silicon layer sequentially stacked from bottom to top, wherein a back chamber is formed in the substrate, the back chamber sequentially penetrates through the first silicon layer and the first oxide layer, and the second silicon layer is exposed by the back chamber;
a second oxide layer formed on the substrate;
a piezoelectric unit formed on the second oxide layer and including a first electrode layer, a piezoelectric layer and a second electrode layer sequentially stacked from bottom to top;
a slit formed in the middle of the second electrode layer and penetrating through the second electrode layer, the piezoelectric layer, the first electrode layer, the second oxide layer and the second silicon layer;
an opening formed at an edge of the second electrode layer and penetrating through the second electrode layer and the piezoelectric layer, wherein the first electrode layer is exposed by the opening;
a metal pad stacked on the first electrode layer at the opening; and
an additional film layer including a first part, a second part and a third part, wherein the first part is formed in the slit, a side wall of the first part is attached to an inner wall surface of the slit, a bottom wall of the first part covers a bottom opening of the slit, and the side wall and the bottom wall of the first part surround to form a groove having a top opening, the second part is formed on the second electrode layer, and the third part is formed in the opening and wraps the metal pad, a through slot is formed penetrating through the third part and corresponding to the metal pad, and the metal pad is exposed by the through slot.

2. The acoustic transducer according to claim 1, wherein the first part, the second part and the third part have a same thickness, and the thicknesses of the first part, the second part and the third part are consistent at each position.

3. The acoustic transducer according to claim 1, wherein the metal pad has a thickness smaller than the piezoelectric layer.

4. The acoustic transducer according to claim 1, wherein an axis of the groove is coaxial with an axis of the back chamber.

5. The acoustic transducer according to claim 1, wherein a plane where a bottom of the groove is located intersects with the second silicon layer.

6. A method for manufacturing an acoustic transducer, comprising:
providing a substrate, wherein the substrate includes a first silicon layer, a first oxide layer and a second silicon layer sequentially stacked from bottom to top;
sequentially forming a second oxide layer, a first electrode layer, a piezoelectric layer and a second electrode layer on top of the second silicon layer from bottom to top;
forming a slit by etching in the middle of the second electrode layer and forming an opening by etching at an edge of the second electrode layer, wherein the slit sequentially penetrates through the second electrode layer, the piezoelectric layer, the first electrode layer, the second oxide layer and the second silicon layer, the opening penetrates through the second electrode layer and the piezoelectric layer, and the first electrode layer is exposed by the opening;
forming a metal pad on the first electrode layer at the opening;
forming an additional film layer, wherein a first part of the additional film layer is deposited in the slit, a side wall of the additional film layer covers an inner wall surface of the slit, a bottom wall of the first part covers the first oxide layer, and the side wall and the bottom wall surround to form a groove having a top opening, a second part of the additional film layer is deposited on the second electrode layer, and a third part of the additional film layer is deposited in the opening and wraps the metal pad, a through slot is formed penetrating through the third part and corresponding to the metal pad, and the metal pad is exposed by the through slot; and
forming a back chamber on bottom of the first silicon layer, wherein the back chamber sequentially penetrates through the first silicon layer and the first oxide layer, and the second silicon layer is exposed by the back chamber.

7. The method according to claim 6, wherein the additional film layer is made of a poly-p-xylylene material.

8. The method according to claim 7, wherein the additional film layer is formed by a vapor deposition process.

9. The method according to claim 7, wherein the vapor deposition process comprises a physical vapor deposition process or a chemical vapor deposition process.

10. The method according to claim 6, wherein the piezoelectric layer is made of one of lead zirconate titanate, aluminum nitride, barium titanate, or any combination thereof.

* * * * *